March 11, 1924.　　　　　　　　　　　　　　　　1,486,510
F. G. WHITTINGTON
INSTRUMENT DRIVE FOR MOTOR VEHICLES
Filed March 17, 1922
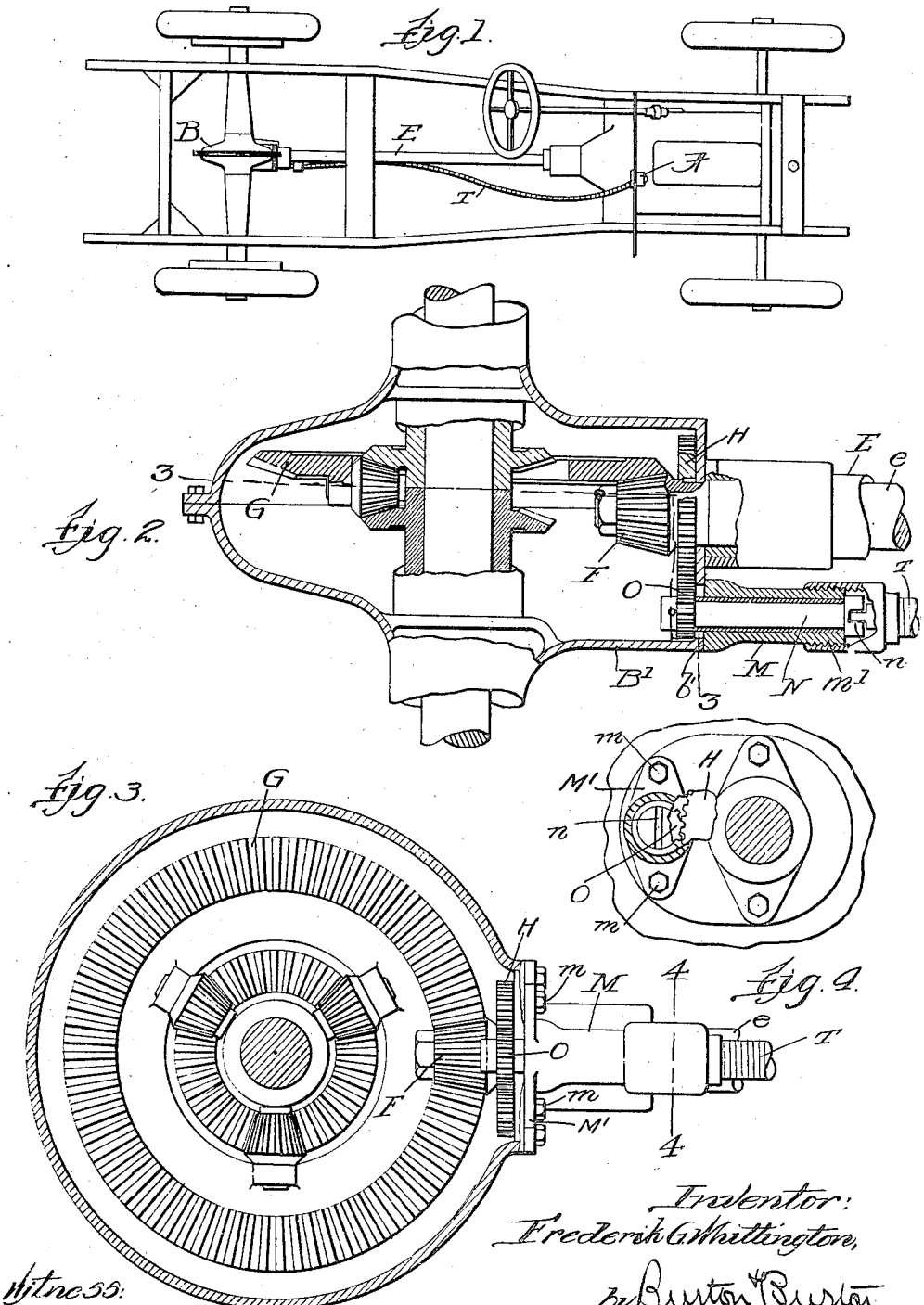

Patented Mar. 11, 1924.                                                          1,486,510

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

INSTRUMENT DRIVE FOR MOTOR VEHICLES.

Application filed March 17, 1922. Serial No. 544,649.

*To all whom it may concern:*

Be it known that I, FREDERIK G. WHITTINGTON, a citizen of the United States, having residence in Evanston, in the county of Cook and State of Illinois, have invented certain new and useful Improvements in Instrument Drives for Motor Vehicles, of which the following is a specification, reference being had to the accompanying drawings, forming a part thereof.

The purpose of this invention is to provide an improved construction for actuating an indicating instrument from the driving mechanism of a motor vehicle. It consists in the elements and features of construction shown and described, as indicated in the claims.

In the drawings:—

Figure 1 is a diagrammatic view showing a portion of the chassis and operating mechanism of a motor vehicle equipped with this invention, the same being shown chiefly as to the position of its parts on the vehicle.

Figure 2 is a section axial with respect to the longitudinal propeller shaft and the rear drive axle through the differential casing and a portion of the propeller shaft casing.

Figure 3 is a section at the line, 3—3, on Figure 2.

Figure 4 is a section at the line, 4—4, on Figure 3.

In the structure shown in the drawings the instrument to be driven, as for example, a speedometer, is shown at A on the dashboard. B represents the differential housing. E is the propeller shaft housing extending therefrom. $e$ is the propeller shaft. F is the driving pinion on the propeller shaft which meshes with the initial or main bevel gear, G, of the differential gear train. The differential housing is slightly enlarged and extended at the forward side at which it makes junction with or merges in the propeller housing, so as to accommodate forward of the bevel gear, F, on the propeller shaft a pinion, H, which, as shown, is a plain spur gear secured upon the back of the bevel gear, F. At the plane of said gear, H, the housing is extended at one side of the propeller shaft, preferably at the right hand side, as seen at $B^1$, said extension terminating forwardly in a flat face or shoulder, $b^1$, through which there is made an aperture leading into the differential case or housing for admitting a journal bearing member, M, which serves as a closure for said opening and in which there is journaled and stopped endwise a driven shaft, N, at the inner end of which there is a pinion, O, which meshes with and is driven by the pinion, H, on the propeller shaft, the opening through the shoulder, $b^1$, is large enough to admit the pinion, O, so that the entire fitting comprising said journal bearing closure with its shaft and pinion thereon may be inserted through the opening, bringing the pinion, O, into mesh with the pinion, H. The journal bearing closure member, M, is provided with a flange, $M^1$, by means of which it is stopped against the shoulder, $b^1$, and through which securing screws, $m$, are set into the boss, $B^1$, for securing said closure journal member in place. The outer end of said closure fitting is exteriorly threaded as shown at $m^1$, to receive the customary interiorly threaded terminal of the casing or flexible shaft and the forward end of the driven shaft, N, in said journal bearing closure fitting is provided with a slot, $n$, for engagement with the rotary member of an encased flexible shaft, shown at T, for extending to the speedometer.

I do not limit myself to any particular form of intermeshing gear where I have shown the spur gears, H and O; and I do not limit myself to positioning the aperture which is closed by the journal bearing closure member, M, and said closure member and the driven shaft therein in the position shown,—that is, extending parallel with the propeller shaft; but, obviously, by a proper modification of the character of the intermeshing gear on the propeller shaft and on said driven shaft respectively, the driven shaft may be made to extend in a different direction. But I consider it preferable to extend this shaft substantially parallel to the propeller shaft for avoiding unnecessary flexure of the flexible shaft in leading it to the speedometer; and for this reason I regard the spur gears as the preferable form of gear for communicating the driving from the propeller shaft to the shaft with which the flexible shaft is connected.

I claim:—

1. In a motor vehicle in combination with a differential mechanism and its casing, said casing having an aperture in the forward side of the bell which encompasses the main gear wheel, and the driving pinion carried by the intruded end of the propeller shaft, meshing with said main gear wheel; a second pinion on the propeller shaft within said bell of the differential casing; a closure for said aperture; a driven shaft journaled in said closure; a pinion on said driven shaft at the inner side meshing with said second pinion on the propeller shaft; the closure having at its outer side a terminal for connecting a flexible shaft casing, and the outer end of said driven shaft being adapted for coupling the rotating element on the flexible shaft.

2. In the construction defined in claim 1, foregoing, the second gear on the propeller shaft and the gear of the driven shaft in the closure being spur gears, whereby the driven shaft may extend substantially parallel with the propeller shaft.

In testimony whereof, I have hereunto set my hand at Chicago, Illinois, this 11th day of March, 1922.

FREDERIK G. WHITTINGTON.